United States Patent
Haralabidis et al.

(10) Patent No.: US 8,009,786 B2
(45) Date of Patent: Aug. 30, 2011

(54) METHOD FOR AGILE REGION AND BAND CONSCIOUS FREQUENCY PLANNING FOR WIRELESS TRANSCEIVERS

(75) Inventors: Nikolaos C. Haralabidis, Athens (GR); Theodoros Georgantas, Chaidari (GR)

(73) Assignee: Broadcom Corporation, Irvine, CA (US)

(*) Notice: Subject to any disclaimer, the term of this patent is extended or adjusted under 35 U.S.C. 154(b) by 712 days.

(21) Appl. No.: 12/037,722

(22) Filed: Feb. 26, 2008

(65) Prior Publication Data
US 2009/0213974 A1 Aug. 27, 2009

(51) Int. Cl.
*H03D 3/24* (2006.01)
(52) U.S. Cl. ........ 375/376; 375/219; 375/278; 375/295; 375/316; 455/73; 455/76; 455/230; 455/260; 327/147; 327/156
(58) Field of Classification Search .............. 375/219, 375/278, 295, 316, 376; 455/73, 76, 230, 455/260; 327/147, 156
See application file for complete search history.

(56) References Cited

U.S. PATENT DOCUMENTS

| | | | |
|---|---|---|---|
| 6,065,140 A * | 5/2000 | Irwin | 714/703 |
| 6,564,039 B1 * | 5/2003 | Meador et al. | 455/76 |
| 6,868,261 B2 | 3/2005 | Shi et al. | |
| 2005/0113053 A1 | 5/2005 | Shi et al. | |
| 2008/0028248 A1 | 1/2008 | Rofougaran | |
| 2008/0181337 A1 * | 7/2008 | Maxim | 375/340 |
| 2009/0128242 A1 * | 5/2009 | Fitzgibbon | 331/17 |

* cited by examiner

*Primary Examiner* — Leon Flores
(74) *Attorney, Agent, or Firm* — Garlick Harrison & Markison (57) ABSTRACT

A technique for agile region and band conscious frequency planning for wireless transceivers in which a comparison frequency is selected for generating a local oscillator signal. The comparison frequency ($F_{comp}$) is selected for a frequency band of a particular communication standard or protocol, in order not to introduce harmonic components of the selected comparison frequency in a transmitted signal from the wireless device that generates spurious emissions restricted by the particular communication protocol or another protocol. The $F_{comp}$ selection may also take into consideration restrictive region-specific criteria for out-of band spurious emissions.

12 Claims, 7 Drawing Sheets

| Standard | Band | Fcomp (MHz) | Region |
|---|---|---|---|
| 3GPP Rel. 8 FDD | Band I | 312.00 | AU, EU, JP |
| 3GPP Rel. 8 FDD | Band II | 184.88 | NA |
| 3GPP Rel. 8 FDD | Band III | 249.60 | EU |
| 3GPP Rel. 8 FDD | Band IV | 312.00 | NA |
| 3GPP Rel. 8 FDD | Band V | 312.00 | AU, NA |
| 3GPP Rel. 8 FDD | Band VI | 312.00 | JP |
| 3GPP Rel. 8 FDD | Band VII | 293.65 | EU |
| 3GPP Rel. 8 FDD | Band VIII | 293.65 | EU |
| 3GPP Rel. 8 FDD | Band IX | 232.96 | JP |
| 3GPP Rel. 8 FDD | Band X | 312.00 | NA |
| 3GPP Rel. 8 FDD | Band XI | 232.96 | JP |
| 3GPP Rel. 8 FDD | Band XII | 312.00 | TBD |
| 3GPP Rel. 8 FDD | Band XIII | 312.00 | TBD |
| 3GPP Rel. 8 FDD | Band XIV | 312.00 | TBD |
| 3GPP Rel. 8 FDD | Band XV | 312.00 | TBD |
| 3GPP Rel. 8 FDD | Band XVI | 312.00 | TBD |
| EGPRS | GSM850 | 312.00 | NA |
| EGPRS | EGSM900 | 293.65 | AU, EU |
| EGPRS | DCS1800 | 312.00 | AU, EU |
| EGPRS | PCS1900 | 312.00 | NA |

METHOD FOR AGILE REGION AND BAND CONSCIOUS FREQUENCY PLANNING FOR WIRELESS TRANSCEIVERS

BACKGROUND OF THE INVENTION

1. Technical Field of the Invention

The present invention relates generally to wireless communication systems and, more particularly, to a frequency planning scheme for use with the operation of a local oscillator in a wireless communication device.

2. Description of Related Art

Mobile communication has changed the way people communicate and mobile phones have been transformed from a luxury item to an essential part of every day life. The use of mobile phones today is generally dictated by social situations, rather than being hampered by location or technology. While voice connections fulfill the basic need to communicate, and mobile voice connections continue to filter even further into the fabric of every day life, the mobile Internet and moving video, including broadcast video, are the next steps in the mobile communication revolution. The mobile Internet is poised to become a common source of everyday information, and easy, versatile mobile access to this data will be taken for granted. Similarly, video transmissions to handheld user equipment will allow movies and television programs to be viewed on the go.

Third generation (3G) cellular networks have been specifically designed to fulfill many, if not all, of these future demands. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers want technologies that will allow them to increase downlink throughput and, in turn, offer advanced QoS capabilities and speeds that rival those delivered by cable modem and/or DSL service providers. In this regard, networks based on Code Division Multiple Access (CDMA) technology or Wideband Code Division Multiple Access (WCDMA) technology may make the delivery of data to end users a more feasible option for today's wireless carriers.

The General Packet Radio Service (GPRS) and Enhanced Data rates for GSM (EDGE) technologies may be utilized for enhancing the data throughput of present second generation (2G) systems such as GSM. The Global System for Mobile telecommunications (GSM) technology may support data rates of up to 14.4 kilobits per second (Kbps), while the GPRS technology may support data rates of up to 115 Kbps by allowing up to 8 data time slots per time division multiple access (TDMA) frame. The GSM technology, by contrast, may allow one data time slot per TDMA frame. The EDGE technology may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The Universal Mobile Telecommunications System (UMTS) technology with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The High Speed Downlink Packet Access (HSDPA) technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods.

Where HSDPA is a downlink protocol, High Speed Uplink Packet Access (HSUPA) technology addresses the uplink communication. HSUPA is also specified by the 3GPP group to provide a complement data link to HSDPA. HSUPA also offers broadband IP and is based on software. HSUPA also extends the WCDMA bit rates, but the uplink rates may be less than the downlink rates of HSDPA. Where prior protocols severely limited the uplink connections, HSUPA allows for much higher uplink rates.

Likewise, standards for Digital Terrestrial Television Broadcasting (DTTB) provide for transmission of broadcast video. Three leading DTTB systems are the Advanced Television Systems Committee (ATSC) system, the Integrated Services Digital Broadcasting-Terrestrial (ISDB-T) system, and the Digital Video Broadcasting (DVB) system, which includes terrestrial transmission under Digital Video Broadcasting-Terrestrial (DVB-T) specifications and transmissions to handheld devices under Digital Video Broadcasting-Handheld (DVB-H) specifications. DVB-H is an adaptation of DVB-T to handheld units, in which additional features are implemented to meet specific requirements of handheld units. DVB-H allows downlink channels with high data rates and may be made as enhancements to current mobile wireless networks. DVB-H may use time slicing technology to reduce power consumption of handheld devices.

In order to practice the various protocols, a wireless communication device is utilized. For a wireless communication device to participate in wireless communications, it typically includes a built-in radio transceiver (i.e., receiver and transmitter) or is coupled to an associated radio transceiver (e.g., a station for in-home and/or in-building wireless communication networks, RF modem, etc.). The transmitter typically includes a data modulation stage, one or more intermediate frequency stages, and a power amplifier. The data modulation stage converts raw data into baseband signals in accordance with a particular wireless communication standard. The one or more intermediate frequency stages mix the baseband signals with a local oscillator signal to produce radio frequency (RF) signals. The power amplifier amplifies the RF signals prior to transmission via an antenna.

The receiver is coupled to an antenna and typically includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with a local oscillator signal to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Generally, when a wireless device, such as a mobile 3G transceiver, is in a transmit mode of operation, the device operates under a particular communication standard and/or protocol. The communication standard specifies specific frequency bands and power levels that a particular device is allowed to transmit. The specific transmission requirements are set by the communication standard based on the designated band, public or commercial use of the frequency, type of transmission, as well as other criteria. The frequency bands and transmission requirements may also vary depending on the geographic location, whether it be a region, country or continent.

The various communication standards also typically require strict adherence to requirements that prevent out-of-band transmissions from the transmitter in order not to interfere with other bands, channels and/or frequencies. The 3G standards also have restrictions placed on spurious emissions outside of the designated permitted transmission band. One of the causes of spurious emissions in a RF front end of a transmitter is due to the operation of the mixer in mixing the baseband or IF signal with a local oscillator signal to generate the RF signal. Although various suppression techniques or filtering may be used to reduce the spurious emissions, one component that contributes to such spurious emissions remains fixed. That component is the harmonics generated by the reference frequency (which is also defined as the comparison frequency) of the reference signal input to the transmitter local oscillator.

In a typical local oscillator (LO) that generates a LO signal used by the transmitter, a reference frequency source, such as a crystal source, sets the reference frequency (or comparison frequency; noted as $F_{comp}$) signal for input to the LO, which may employ a phase-locked loop (PLL) circuitry for generating the local oscillator signal. The harmonics of the comparison frequency (noted as $N*F_{comp}$, where N is an integer) combine with the transmit signal $F_{TX}$ to produce harmonic induced spurious emissions $F_{harm}$ at the output. For example, equation $F_{harm} = F_{TX} \pm N*F_{comp}$ exemplifies a harmonic signal generation that results in a spurious emission at the output of the transmitter. In some instances, this type of spurious emission may not violate restrictions specified by a particular communication standard, but in other instances, the spurious emissions may result in out-of-band transmission that is in violation of a standard.

Unfortunately, when $F_{comp}$ is fixed, the harmonic generation due to $F_{comp}$ is also pre-determined and those harmonic frequencies are also fixed. Therefore, when such harmonic generation has a potential for out-of-band transmission which are restricted by a communication standard, the transmitter may need to implement some form of suppression technique for suppressing such harmonic transmission. However, if transmitters can be designed with selectable $F_{comp}$ signals that take into consideration the various out-of-band restrictions based on a plurality of communications standards (or protocols) in use, then harmonic generation from the $F_{comp}$ signal would not contribute to unwanted out-of-band spurious emissions from a transmitter.

Therefore, a need exists for a technique to implement an agile frequency planning scheme for generating the $F_{comp}$ signal as a reference input to the transmitter LO, in which the frequency planning scheme considers restrictions placed on spurious emissions dictated by one or more communication standards or protocols.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

DETAILED DESCRIPTION OF THE EMBODIMENTS OF THE INVENTION

The embodiments of the present invention may be practiced in a variety of settings that utilize a wireless communication transceiver. The specific embodiments described below pertain to generating a selectable $F_{comp}$ for use by a PLL-based transmitter LO circuit used at a RF front-end of a wireless device. However, the invention need not be limited to such applications and different embodiments of the invention may be implemented in other circuitry and applications. For example, embodiments of the invention may be readily implemented in a downlink device, as well as in an uplink device, or adapted for use in a receiver section of a wireless device to prevent out-of-band interference.

Figure 1:
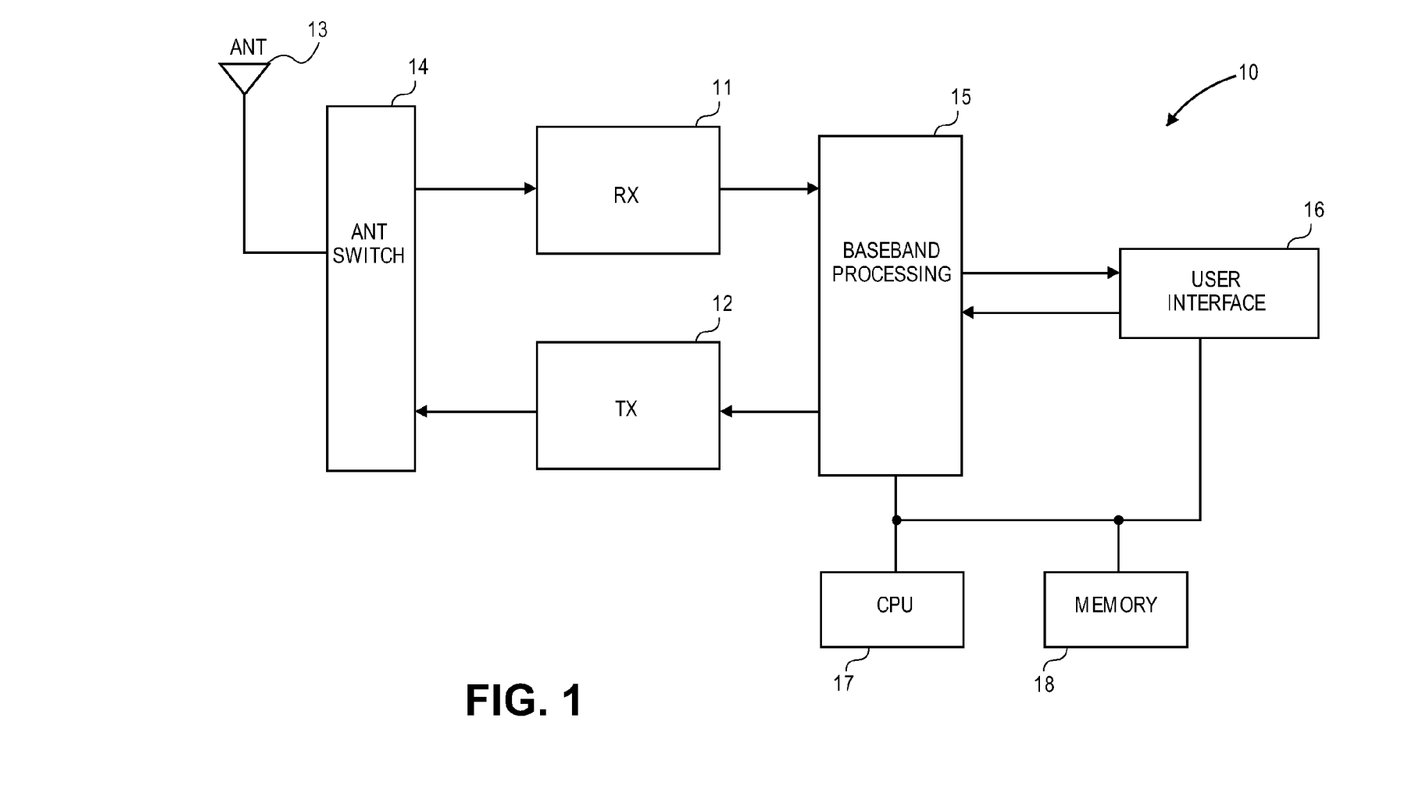
FIG. 1 is a block diagram showing an exemplary downlink device used in a wireless communication system, in which the downlink device operates as a transceiver.

FIG. 1 shows a wireless device 10 which is used in a wireless communication system. Device 10 may be of a variety of wireless devices for sending and receiving data. As such, device 10 may be a computing device, a routing device, a communication device, etc. In one instance, device 10 may be used as a user terminal or user equipment (UE) for communicating with an uplink device. Device 10 may be a cell phone for receiving and sending audio communication and/or text messaging. Device 10 may also send and receive packet traffic for communications through the Internet, or some other network. Device 10 may also send and/or receive video data. In other instances, device 10 may receive moving video and/or broadcast transmissions, such as broadcast television. Device 10 may be used in a computer, such as a desktop computing unit or a laptop computing unit. What is to be noted is that device 10 may operate to receive a variety of signals transmitted from another device and the received signal depends on the particular environment of the communication system that device 10 operates in. Furthermore, device 10 may transmit signals to another device. In one embodiment, device 10 may be a downlink device, such as a cell phone or some other handheld device that is operated by a user.

Device 10 includes a receiver (RX) 11 and transmitter (TX) 12 which are coupled to an antenna 13, via switch 14. Switch 14 may take many forms and may implement different radio frequency (RF) switching technology. Switch 14 may include transmit/receive (T/R) switching circuitry and/or duplexers, etc. What is to be noted is that some form of switching and/or duplexing may be implemented between antenna 13 and the RF front end of device 10. In some instances antenna 13 may comprise multiple antennas. Receiver 11 includes suitable circuitry to receive and convert inbound RF signals to inbound baseband signals. Likewise, transmitter 12 includes suitable circuitry to convert outbound baseband transmit signals to outbound RF signals for transmission from antenna 13.

Device 10 also includes a baseband processing module 15 and user interface 16. Baseband processing module 15 is coupled to receiver 11 to process the converted inbound signals from receiver 11 and to provide an output to the user of the device through interface 16. Similarly, user inputs at interface 16 are coupled to baseband processing module 15 and outbound signals for transmission are coupled to transmitter 12. User interface 16 may take various forms including, but not limited to, a video display, keyboard, microphone, headphones and/or speakers. Baseband processing module generally performs baseband operations in signal processing for received signals and likewise for signals to be transmitted.

Device 10 may also include a general (or host) processor 17 to control various processing operations of device 10, including control functions for interface 16 and baseband processing module 15. Processor 17, in some applications, is referred to as a Central Processing Unit (CPU). A memory component 18, which may be an internal memory or an add-on memory, may be included to operate with processor 17. It is to be noted that a variety of storage devices may be implemented for memory 18. Processor 17 is shown coupled to baseband processing module 15 and user interface 16, but other connections are possible to various components of device 10 in other embodiments.

As noted above, device 10 is a wireless device and in one embodiment, device 10 operates as a downlink transceiver for receiving and sending communication signals. In one embodiment, device 10 is operated as a handheld terminal in a communication link. In particular, device 10 may operate within a cellular environment. As such device 10 may be a cell phone. Although a variety of receivers and transmitters (transceivers) may be implemented for RX 11 and TX 12, one particular embodiment is illustrated in FIG. 2.

Figure 2:
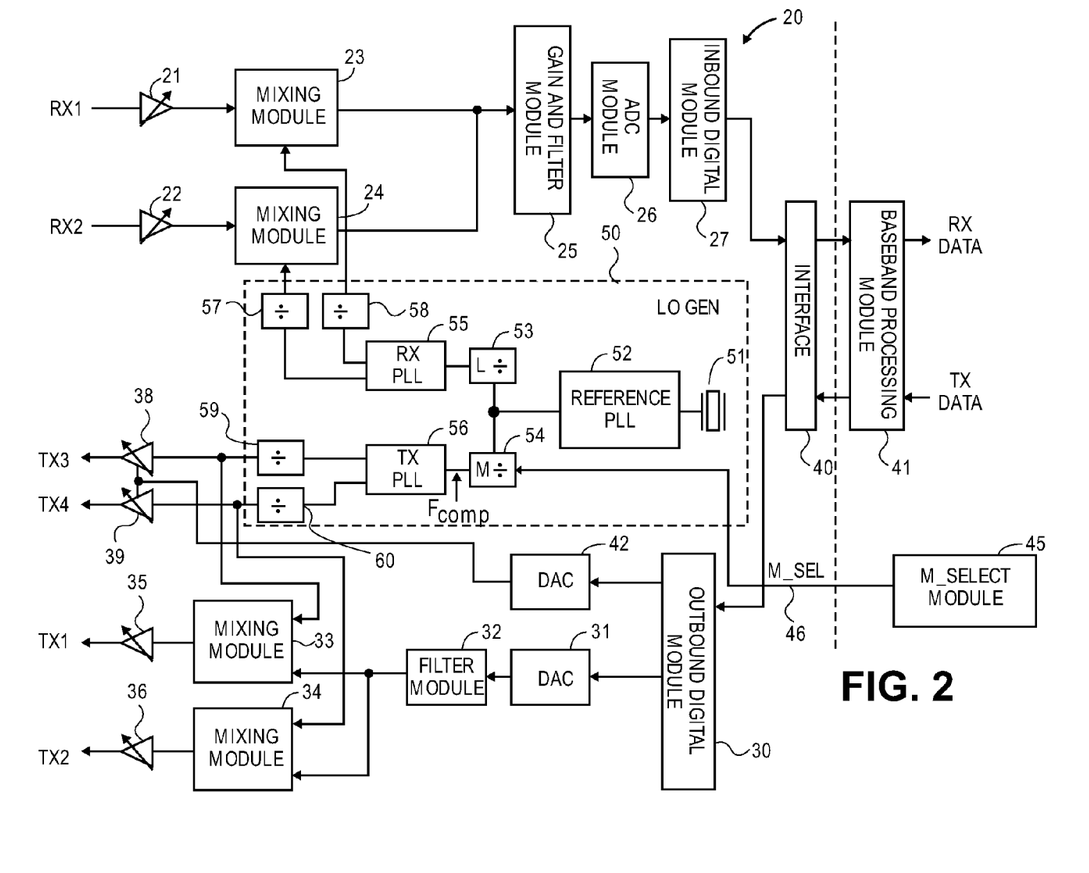
FIG. 2 is a block schematic diagram of an exemplary RF front-end of a wireless device that implements an embodiment of the agile frequency planning scheme of the present invention for a transmitter local oscillator.

FIG. 2 shows a single-chip multiple-band RF transceiver that may be implemented in a RF front-end of a variety of wireless devices, including device 10 of FIG. 1. In one embodiment, transceiver stage 20 is constructed on a single integrated circuit (IC). A baseband interface 40 couples the transceiver stage to a baseband processing module 41. Baseband processing module 41 may be utilized for baseband processing module 15 of FIG. 1. Furthermore, baseband processing module 41 may be constructed on the same IC as transceiver stage 20. Alternatively, baseband processing module 41 may be constructed on a separate IC. The vertical dotted-line shown in FIG. 2 separates transceiver stage 20 from the baseband stage.

The receiver side of transceiver stage 20 includes a first low-noise amplifier (LNA) module 21, second LNA module 22, first receiver mixing module 23, second receiver mixing module 24, gain and filter module 25, analog-to-digital converter (ADC) 26 and inbound digital module 27. The transmitter side of transceiver stage 20 includes an outbound digital module 30, first digital-to-analog converter (DAC) 31, a second DAC 42, filter module 32, first transmitter mixing module 33, second transmitter mixing module 34, first power amplifier (PA) module 35, second PA module 36, third PA module 38 and fourth PA module 39. It is to be noted that any or all of PA modules 35, 36, 38, 39 may be the power amplifier itself or a driver that drives a power amplifier that may reside on-chip or off-chip. Further, it is to be noted that although a specific number of LNA modules and PA modules are noted, there may be more such units in other embodiments, while in other embodiments there may only be one LNA and/or PA. Furthermore, LNA modules are hereinafter simply referred to as LNAs and PA modules are simply referred to as PAs.

In the particular embodiment of FIG. 2, multiple LNAs are used so that each LNA 21, 22 operates on a selected set or band of receiving frequencies. Similarly, multiple PAs are used so that each PA (or PA driver) operates on a selected set or band of transmitting frequencies. Thus, inbound RF input to LNA 21 is designated as RX1 and RF input to LNA 22 is designated as RX2. RX1 and/or RX2 may each be a single band or multiple band of frequencies. Outbound RF signals for transmission are noted as TX1, TX2, TX3 and TX4, which correspond to outputs from PAs 35, 36, 38, 39, respectively.

Although the range of frequencies operated on by each LNA varies from embodiment to embodiment, in one implementation, LNA 21 accepts one set of signals within a frequency band that is at approximately 700 to 800 MHz and accepts a second set of signals within a frequency band that is at approximately 900 MHz. Also with this embodiment, LNA 22 accepts signals within three separate frequency bands, where the bands are noted at approximately 1800 MHz, 1900 MHz and 2100 MHz. Additional LNAs may also exist to cover other bands, such as the 1500 MHz and the 2500 MHz bands. Any or all LNAs may be respectively used to operate at the Long Term Evolution (LTE) protocol.

It is to be noted that some frequency bands may be set standards and a given band may be identified by a single frequency. For example, a frequency band at 700 to 800 MHz may actually refer to frequencies in a range of 730-894 MHz. Likewise, a frequency band at 900 MHz may actually refer to frequencies in a range of 880-915 MHz or 925-960 MHz. Some of the frequency ranges may depend on whether the communication of the particular band is uplink communication or downlink communication. Typically, these frequency bands define a range of frequencies for a particular communication protocol that is being used The PAs also operate in a like manner, in which each operates to transmit signals in one or more band of frequencies. Thus, in the described example embodiment, PA 38 outputs signals within two separate frequency bands, where a first band is at approximately 1800 MHz and a second band is at approximately 1900 MHz. PA 39 is used to output signals within two separate frequency bands, where the one band is at approximately 850 MHz and the other band is at approximately 900 MHz. Likewise, PA 36 outputs signals within two frequency bands, where one band is at approximately 850 MHz and the other band is at approximately 900 MHz. PA 35 outputs signals within three frequency bands, where a first band is at approximately 1800 MHz, a second band is at approximately 1900 MHz and a third band is at approximately 2100 MHz. Additional PAs may also be used to cover the frequency bands at 1500 MHz and 2500 MHz. As noted above, these frequency bands define a range of frequencies for a particular communication protocol that is being used. Furthermore, in one embodiment, PAs 38, 39 are operable for GSM/EDGE signal transmissions, while PAs 35, 36 are operable for WCDMA transmissions. The additional PAs may be used to cover recently assigned bands at 1500 MHz and 2500 MHz. Apart from the GSM/EDGE and CDMA/WCDMA protocols, they may be also used to operate at the LTE protocol. It is to be noted that other embodiments may have different frequency band schemes and those described herein are examples of particular embodiments of the invention.

Although not shown in detail, it is to be noted that the antenna circuitry, as noted by antenna 13 and antenna switch 14 in FIG. 1, may be comprised of one or more antennas, duplexers, switches, transmission lines, transformer baluns, impedance matching networks, filters (such as a Surface Acoustic Wave or SAW filter) and/or tuners to operate on and transfer the various band(s) of received signals from the antenna(s) to the appropriate LNA and transfer the various PA output signals to the antenna(s) for transmission. Furthermore, the signals may take various forms, including but not limited to GSM, EDGE, CDMA, WCDMA, GMSK (Gaussian Minimum-Shift Keying), 2-GMSK, 4-GMSK, 8-PSK (Phase-Shift Keying), MSK (Minimum-Shift Keying), FSK (Frequency-Shift Keying), ASK (Amplitude-Shift Keying), QPSK (Quadrature Phase-Shift Keying), QAM (Quadrature Amplitude-Shift Keying), BPSK (Binary Phase-Shift Keying) and 8-PSK, just to name a few.

The received signal RX1 is amplified by LNA 21 and down-converted in mixing module 23. Likewise, the received signal RX2 is amplified by LNA 22 and down-converted in mixing module 24. The outputs of the two receiver mixing modules 23, 24 are coupled to gain and filter module 25 for gain adjustment and filtering of the signal and subsequently converted to digital format in ADC module 26. It is to be noted that although one receive path is shown in FIG. 2 between the modules, in actuality separate paths exists for the in-phase (I) component and the quadrature (Q) component. The I and Q outputs from ADC module 26 are coupled to inbound digital module 27, which provides further processing prior to coupling the received signals to baseband processing module 41, via interface 40. The receive output from baseband processing module is shown as RX DATA. Additionally, it is to be noted that inputs and outputs from various components on the receive path may be single-ended or differential.

The transmitter side operates in reverse. Baseband processing module 41 receives TX DATA and provides the baseband processing. The outbound signal which is to be converted and transmitted is sent to outbound digital module 30 via interface 40. Although other embodiments may have different transmitting paths, in this particular embodiment, one set of signals are sent to PAs 38, 39 via DAC 42 to generate TX3 and/or TX4. A second set of signals are sent to PAs 35, 36 via DAC 31 to generate TX1 and/or TX2. This second path utilizes a filter module 32 to filter the analog signal out of DAC 31 and the output of filter module 32 is coupled to mixing modules 33, 34, depending on the frequency of the output. The output of mixing module 33 is coupled to PA 35 to output TX1 and output of mixing module 34 is coupled to PA 36 to output TX2. As noted above, although one line is shown in FIG. 2 between the modules in each transmitting path, in actuality separate paths exist for the I and Q components from inbound digital module 30 to PAs 35, 36. Furthermore, as noted above, one particular embodiment is operable to transmit TX3 and TX4 signals as GSM/EDGE signal transmissions, while TX1 and TX2 signals are WCDMA transmissions. Additionally, it is to be noted that inputs and outputs from various components on the transmit path may be single-ended or differential.

Furthermore, it is to be noted that baseband processing module 41 may perform a variety of processing at the baseband level, including but not limited to one or more of scrambling, encoding, constellation mapping, modulation, frequency spreading, frequency hopping, beamforming, space-time-block encoding, space-frequency-block encoding, and/or digital baseband to IF conversion to convert the outbound signal. Depending on the desired formatting of the outbound signal, the baseband processing module 41 may generate the outbound signal as Cartesian coordinates (e.g., having an in-phase signal component and a quadrature signal component to represent a symbol), as Polar coordinates (e.g., having a phase component and an amplitude component to represent a symbol), or as hybrid coordinates.

In addition, it is to be noted that baseband processing module 41 also converts the inbound signal by performing a variety of processing at the baseband level, including but not limited to, one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound signal.

In order to generate local oscillator (LO) signals for performing signal conversion, transceiver stage 20 also includes a local oscillator generator module (LO GEN) 50. LO GEN 50 includes a reference clock source, which in this example embodiment is a reference crystal 51. Although crystal 51 is shown as part of LO GEN 50, crystal 51 may reside on-chip or off-chip. Crystal 51 operates as a clock reference and a particular crystal frequency is selected for the reference clock for LO GEN 50. In some instances, the crystal frequency may be dictated by the particular communication standard or protocol being used. This reference frequency is input to a reference input of a reference PLL 52. In this particular embodiment, PLL 52 is utilized to generate a first clock signal based on the reference clock input and in which the first clock signal is then used to drive a second PLL to generate a transmitter local oscillator signal.

An output of reference PLL 52 is coupled to two other PLLs, one noted as receiver (RX) PLL 55 and the other as transmitter (TX) PLL 56, via dividers 53 and 54, respectively. Divider 53 divides the clock output from PLL 52 and the divided clock output is coupled as a reference input to RX PLL 55. Similarly, divider 54 divides the clock output signal from PLL 52 and this divided clock output signal is coupled as a reference input to TX PLL 56. In reference to RX PLL 55, the configuration may vary in other embodiments, depending on the system implementation. For example, in one embodiment, RX PLL 55 may operate using directly the reference frequency from crystal 51 and not the generated frequency from reference PLL 52. Subsequently, PLL output from RX PLL 55 provides a receiver local oscillator (RX LO) signal 70 and this RX LO signal is coupled through divider 57 and then to mixing module 24 as a first divided RX LO signal. The RX LO signal is also coupled through divider 58 and then to mixing module 23 as a second divided RX LO signal. Divider 53 is shown having a dividing factor L. Divisor L may be a fixed value or it may be variable. Also, dividers 57, 58 may be fixed or variable. In one embodiment, divider 57 is a divide-by-two (÷2) divider, while divider 58 is a divide-by-four (÷4) divider.

Likewise, PLL output from TX PLL 56 provides a transmitter local oscillator (TX LO) signal 71 and this TX LO signal is coupled through divider 59 to generate a first divided TX LO signal. TX LO signal is also coupled through divider 60 to generate a second divided TX LO signal. The first divided TX LO signal is coupled to mixing module 33 and PA 38, while the second divided TX LO signal is coupled to mixing module 34 and PA 39. As noted in FIG. 2, divider 54 has a dividing factor M. Whereas dividing factor L may be fixed or variable, dividing factor M on the transmit side is made variable in order to generate different values of the comparison frequency ($F_{comp}$) at the output of divider 54. Also, in one embodiment, divider 59 is a divide-by-two (÷2) divider, while divider 60 is a divide-by-four (÷4) divider.

As described below, divider 54 is made programmable so that different $F_{comp}$ values may be selected based on one or more criteria, and this selected $F_{comp}$ signal is then input to TX PLL 56. In one embodiment, the programmability of divider 54 is controlled by a factor M select signal, M_SEL. Signal M_SEL is generated by a M_select module 45 and coupled to divider 54 to control the divisor value M. Thus, module 45 is used to select an appropriate value of $F_{comp}$ based on one or more criteria, as noted below. It is to be noted that module 45 may reside anywhere within the wireless device and not necessarily in the baseband stage as shown. Module 45 may reside within the RF front end or even off-chip from the RF front end and/or the baseband stage.

Furthermore, it is to be noted that the particular embodiment of FIG. 2 shows two pairs of PAs. PAs 38, and 39 receive one set of outbound signals after being converted to digital format by DAC 42. This is an amplitude component (AM) signal that is modulated with the divided TX LO signal in PAs 38, 39. In one embodiment, this technique is used to generate outbound RF signals for GSM/EDGE communication protocol. The divided TX LO signals are also provided to mixing modules 33, 34 for direct conversion of another set of outbound signals in which the LO signals are modulated by the outbound signal. In one embodiment, this technique is used to generate outbound RF signals for WCDMA communication protocol.

Figure 3:
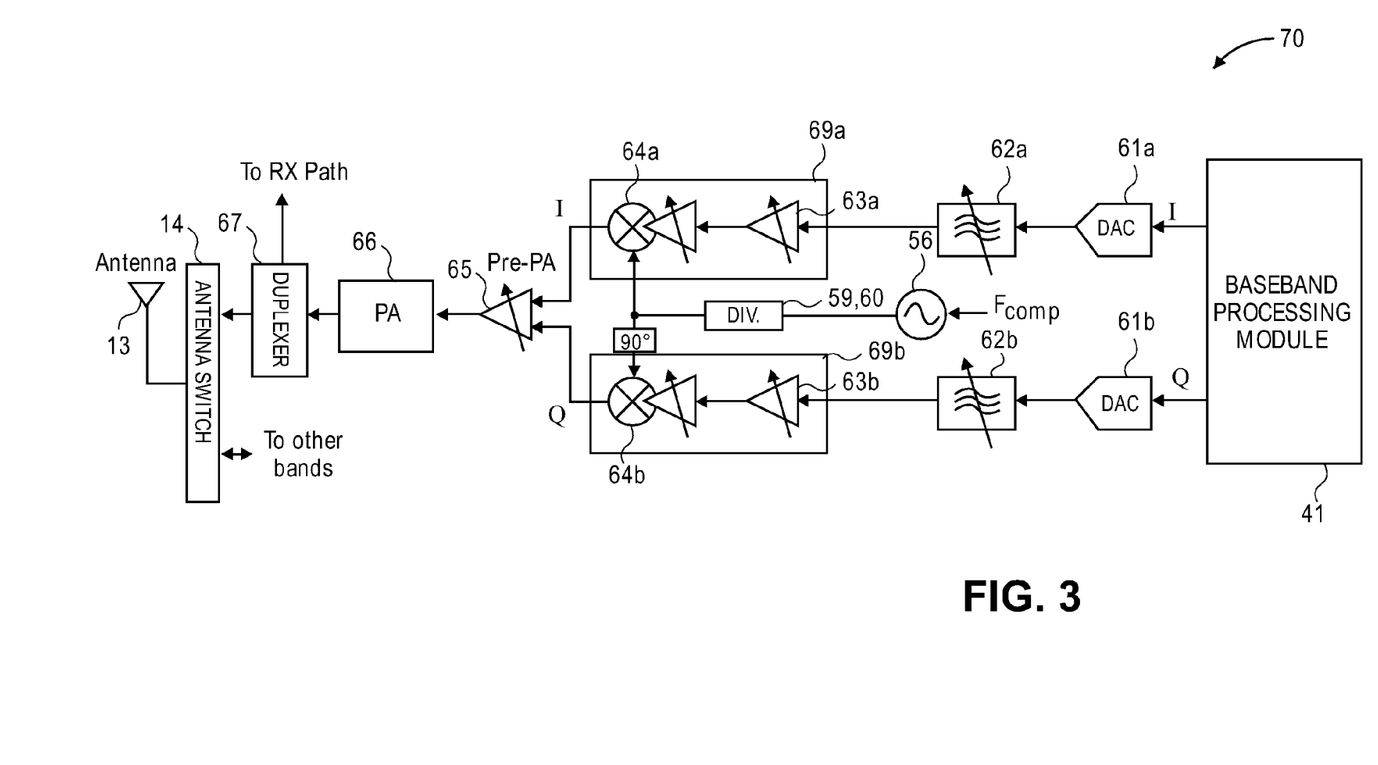
FIG. 3 is a block schematic diagram showing a more detailed circuitry for a portion of one transmitting path for the RF front end of FIGS. 1 and 2.

FIG. 3 shows a circuit 70 that operates as part of a transmitting path for a RF front end. Circuit 70 may be implemented in the transmitter portion of transceiver stage 20 of FIG. 2. Circuit 70 may be implemented in other stages and devices as well. Furthermore, circuit 70 is illustrated having both the I and Q signal paths from baseband processing module 41. The outbound I and Q signals are coupled respectively through I and Q transmitting paths that include DACs 61*a-b*, filters 62*a-b*, mixing modules 69*a-b* and to a pre-PA driver 65. The combined I/Q output of driver 65 is coupled to a PA 66. The output of PA 66 is then coupled to an antenna switch 14, via duplexer 67, for transmission from antenna 13. Although receive and transmit paths may take separate paths to and from antenna 13, in the shown embodiment, duplexer 67 is used to multiplex signals of the TX path and the RX path. In one embodiment duplexer 67 allows for simultaneous receive-transmit Frequency Division Duplex (FDD).

With reference to FIG. 2 for circuit 70, DACs 61 *a-b* are part of DAC 31 and filters 62*a-b* are part of filter module 32. Mixing modules 69*a-b* are part of either mixing module 33 or mixing module 34. Mixing module 69*a* includes an programmable gain amplifier (PGA) 63*a* and mixer 64*a*, while mixing module 69*b* includes PGA 63*b* and mixer 64*b*. As shown in the embodiment of FIG. 3, components 62*a-b*, 63*a-b*, 64*a-b* and 65 are noted as variable gain components. It is to be noted that in other embodiments, only one or some of the components may be variable gain components while others may have fixed gain.

Circuit 70 also shows a local oscillator source to generate a transmitter local oscillator signal. With reference to FIG. 2, the LO source is PLL 56. A frequency divider, such as divider 59 or 60 of FIG. 2, is also shown to divide down the LO signal. The divided LO signal is coupled to I and Q mixers 64*a-b*, in which the LO signal is shifted 90 for mixing with the Q component of the transmitted signal. As noted in reference to FIG. 2, the generated LO signal at the output of TX PLL 56 is based on the $F_{comp}$ signal, in which the $F_{comp}$ signal operates as a clock signal to the reference input of TX PLL 56.

Figure 4:
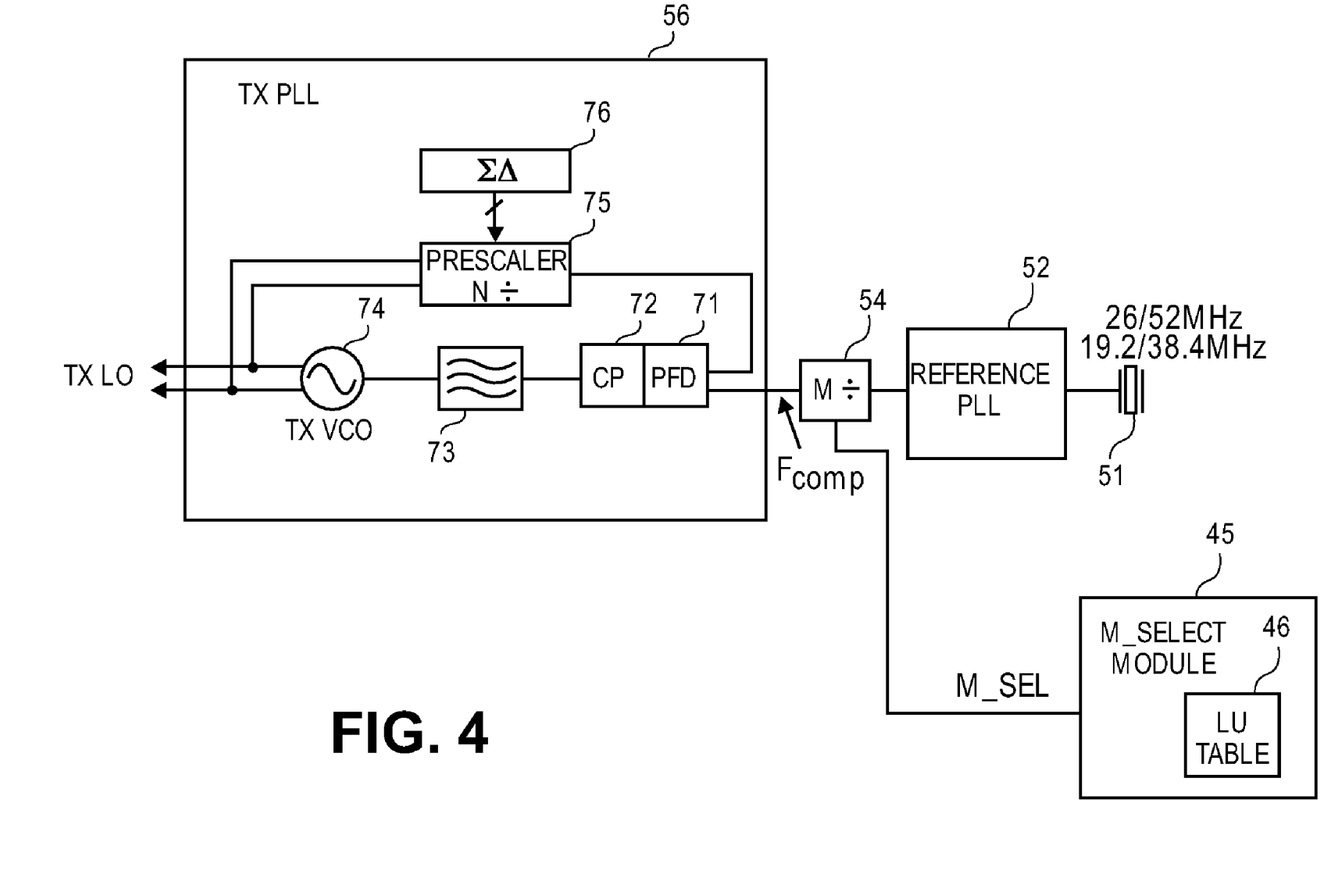
FIG. 4 is a block schematic diagram showing a more detailed portion of the TX LO generation using a selectable comparison frequency ($F_{comp}$) signal.

FIG. 4 shows a more detailed diagram of the transmit side of LO GEN 50 of FIG. 2. As described above, crystal 51 provides a reference frequency signal as a reference input to reference PLL 52. In some instances, the crystals may be arbitrarily selected by a manufacturer, but in other instances, a particular reference frequency or frequencies may be specified by a communication standard or protocol. In the particular example, the specified reference frequency is noted as 26 MHz or 52 MHz (2×26 MHz). In an alternative embodiment, the specified reference frequency is 19.2 MHz or 38.4 MHz (2×19.2 MHz). These are example reference frequencies that may be specified as reference frequencies by a communication standard. In other embodiments, other frequencies may be specified.

Reference PLL 52 then generates a first clock signal output that is based on the reference frequency. Usually, the output from PLL 52 has a higher frequency then the reference frequency, but need not be so. It may be the same or even lower in frequency. For example, in one embodiment a reference frequency of 26 MHz or 52 MHz generates a clock signal of 3120 MHz at the output of PLL 52.

The clock signal from PLL 52 is then coupled to divider 54, which has a dividing factor of M. M is a programmable value determined by signal M_SEL. As an example, if M_SEL selects one of ÷10, ÷11, ÷12 or ÷13 as the dividing factor, then output of divider 54 would have a clock signal with a respective frequency of approximately 312 MHz, 283 MHz, 260 MHz or 240 MHz for a clock signal of 3120 MHz out of PLL 52. It is to be noted that the value of M may be an integer, a fractional part, or a mixed number. The second clock signal at the output of divider 54 is a clock signal having a frequency $F_{comp}$. Clock signal $F_{comp}$ is then coupled as a reference input to PLL 56. PLL 56 then generates TX LO at its output.

In other embodiments, crystal reference frequencies of 26 MHz or 52 MHz may generate a frequency at the output of PLL 52 having a clock frequency of approximately 1248 MHz, 2496 MHz, 4992 MHz, 1456 MHz, 2912 MHz or 5824 MHz. Likewise, crystal frequencies of 19.2 MHz or 38.4 MHz may generate a frequency of approximately 1459.2 MHz, 2918.4 MHz or 5836.8 MHz at the output of PLL 52. These are examples only and other frequencies may be generated in other embodiments.

In reference to the two PLLs shown in FIG. 4, it is to be noted that a variety of PLL circuits may be used. An example PLL circuit is shown for PLL 56. PLL 52 may also use an equivalent circuit as PLL 56. In a typical PLL, the output of the PLL is fedback to the reference input and the two frequencies are compared to generate an error (correction) signal that is a measure of their phase difference. This error signal is then used to adjust the output to the correct frequency. Generally, a reference input is coupled to a phase/frequency detector (PFD) 71 and charge pump 72 unit to measure the phase difference of the two inputs and generate an error signal. A low-pass filter 73 is used to filter the error signal, which is then coupled to a voltage controlled oscillator (VCO) 74 to adjust the VCO output. Aside from providing an output from the PLL, the VCO output is fed back to the PFD-charge pump. In some instances, a prescaler 75 is placed in the feedback loop to scale the feedback frequency by a factor of N, in which N may be an integer or a fractional value. In some instances, a sigma-delta (ΣΔ) unit 76 is used to set the prescaler value.

FIG. 4 also shows M_select module 45 which is used to select a M_SEL signal to determine the dividing factor for divider 54. As noted above, module 45 may reside anywhere in the device to generate M_SEL. M_SEL may be a control signal or value that directs the setting of factor M in divider 54. M_SEL may be generated by hardware, but for the example embodiment noted herein, M_SEL is generated from a plurality of $F_{comp}$ data that may be stored in some storage medium and accessed when a selection of a particular $F_{comp}$ is desired. The storage medium may be of any type, including some form of memory, register, microcode, firmware, disk, etc. In the particular example shown, a plurality of comparison frequencies are stored in a look-up (LU) table 46 of module 45.

Figure 5:
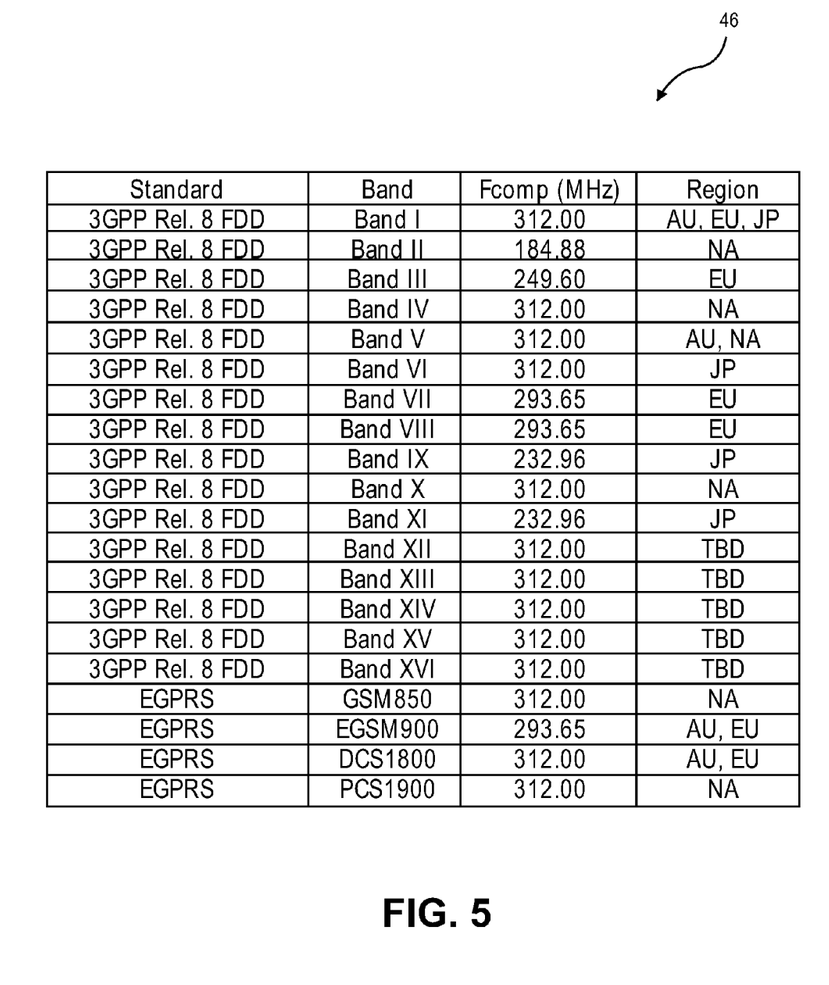
FIG. 5 is an example of a look-up table containing various $F_{comp}$ values based on specific communication standard or protocol being employed by the wireless device.

FIG. 5 shows one example embodiment for a look-up table 46. As shown in FIG. 5, a number of entries are noted in look-up table 46. An entry in look-up table 46 includes a designation of a frequency band for a communication standard (or protocol) and a corresponding $F_{comp}$ that is to be used for that particular standard and frequency band. A region entry may or may not be present. Alternatively, the frequency band entry may take into account the region of operation for the device and the particular standard that is applicable for transmission from the device. Thus for the first entry, frequency Band I for a Release 8 version of the 3GPP standard that is used for simultaneous receive-transmit Frequency Division Duplex (FDD) is noted. The selected $F_{comp}$ for this entry is 312.00 MHz. The corresponding region entry designates that this combination is utilized in Australia (AU), European Union (EU) and Japan (JP). The second entry is for Band II for use in North America (NA), in which the selected $F_{comp}$ is designated as 184.88 MHz. Enhanced GPRS (EGPRS) standard entries are noted at the bottom of the look-up table with various bands for GSM, Enhanced GSM (EGSM), GSM/Digital Communication System (DCS) and GSM/Personal Communication System (PCS), as well as the corresponding $F_{comp}$ and region specific information.

The look-up table entries are accessed to determine which $F_{comp}$ is to be selected based on the particular frequency band of operation for a communication standard that is being employed. The location (or region) information may or may not be accessed depending on the embodiment being utilized. The region information shown may reference a standard for a geographic region, which may be a country, continent or some other regional operating location for a given standard. The region information may also contain other region-specific constraints that may require use of alternative $F_{comp}$ frequencies. This type of region-specific information may be obtained by the data provided by the network operator like, such as the unique operator identity (ID), time zone, as well as other information. Furthermore, the region-specific information may also be derived from data provided by or communicated to the RF system by a position-aware application, such as the Global Positioning System (GPS), Europe's GALILEO global navigation satellite system, as well as others.

Figure 6:
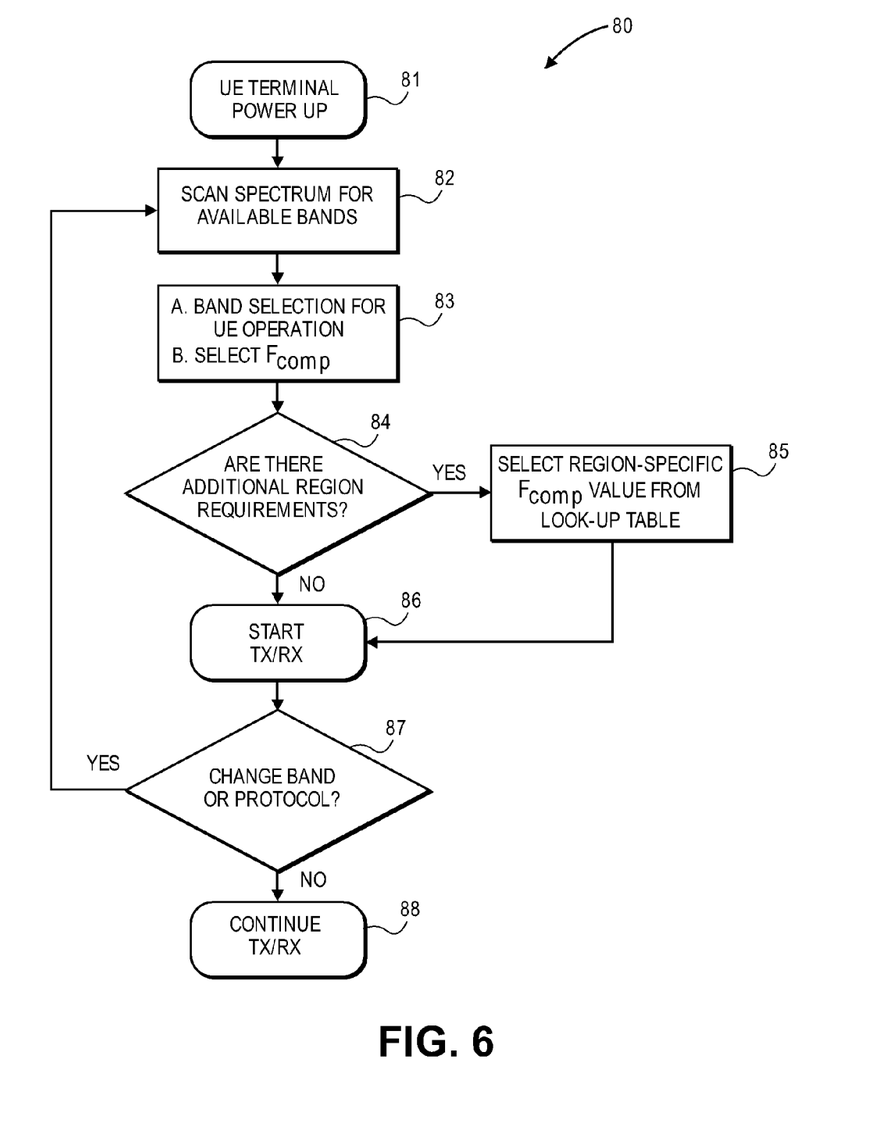
FIG. 6 shows one initialization procedure for a wireless device in selecting an appropriate $F_{comp}$.

Look-up table 46 may be accessed at different times, but in one embodiment, a wireless device, such as a cellular UE, accesses look-up table 46 during initial power-up of the UE. Flow chart 80 of FIG. 6 illustrates one initialization procedure that is performed at power-up of the UE. When UE terminal is powered up (block 81), the device scans the spectrum for available band of operation and selects a $F_{comp}$ for that band (block 82) and communication protocol. It then proceeds to an initial selection of an $F_{comp}$ (block 83). If there are any region-specific constraints (block 84), a $F_{comp}$ that satisfies the region-specific requirement is selected from the look-up table (block 85). Once appropriate $F_{comp}$ value is selected from the look-up table, transmit/receive operation may commence (block 86). If for some reason, a band change or protocol change is initiated (block 87), the procedure to determine the appropriate $F_{comp}$ for the new band or protocol is repeated. Otherwise, the UE may continue to transmit and receive (block 88).

It is to be noted that the procedure noted in flow chart 80 is but just one example of how a particular $F_{comp}$ may be selected based on the particular band of operation for a given standard or protocol. Region-specific information may be present and utilized in some embodiments, but may not in others. Furthermore, other criteria may be present and stored in the look-up table that may place some constraint in selecting an appropriate $F_{comp}$ value.

In reference to FIG. 4, the selected $F_{comp}$ entry is used to generate M_SEL that controls the operation of divider 54 so that the resulting frequency of the clock signal output from divider 54 corresponds to $F_{comp}$. The $F_{comp}$ entries in look-up table 46 are selected based on the band and the communication standard (or protocol), so that the selected $F_{comp}$ does not introduce harmonic components in a transmitted signal from the device that generates spurious emissions restricted by the particular communication standard (or protocol) or another protocol.

A number of advantages are obtained from the scheme of programmably selecting a particular $F_{comp}$ based on a communication standard. For example, one choice for a $F_{comp}$ for W-CDMA bands in general is approximately 312 MHz. However, for Japan, this $F_{comp}$, when used with regional W-CDMA bands I, VI, IX and XI, generates spurs within the Japan-only Personal Digital Cellular (PDC) system. In this case, next optimum $F_{comp}$ for use in Japan for W-CDMA is approximately 232.96 MHz. When a chip is designed with the above-described look-up table, the wireless device is capable of making that differentiation and selecting an appropriate $F_{comp}$ in order not to violate the operating protocol (e.g. W-CDMA in the example) or another protocol (e.g. the Japan-only PDC).

Furthermore, since higher order $F_{comp}$ harmonics that may violate a communication standard or standards are not present, harmonic rejection filters to remove $F_{comp}$ harmonics may not be needed, which reduces component count for the integrated circuit, as well as overall cost. Also, system performance may be enhanced since interfering tones are eliminated, which may result in improved spectrum purity and/or no degradation of signal quality.

Additionally, since separate PLLs are utilized for generating the TX LO signal and the RX LO signal, the TX LO may function independently from the RX LO generation, so that restrictions are not placed on the TX LO based on RX LO requirements. These are just some of the possible advantages that may be derived with the practice of the embodiments of the present invention. Still other advantages may be obtained as well.

Figure 7:
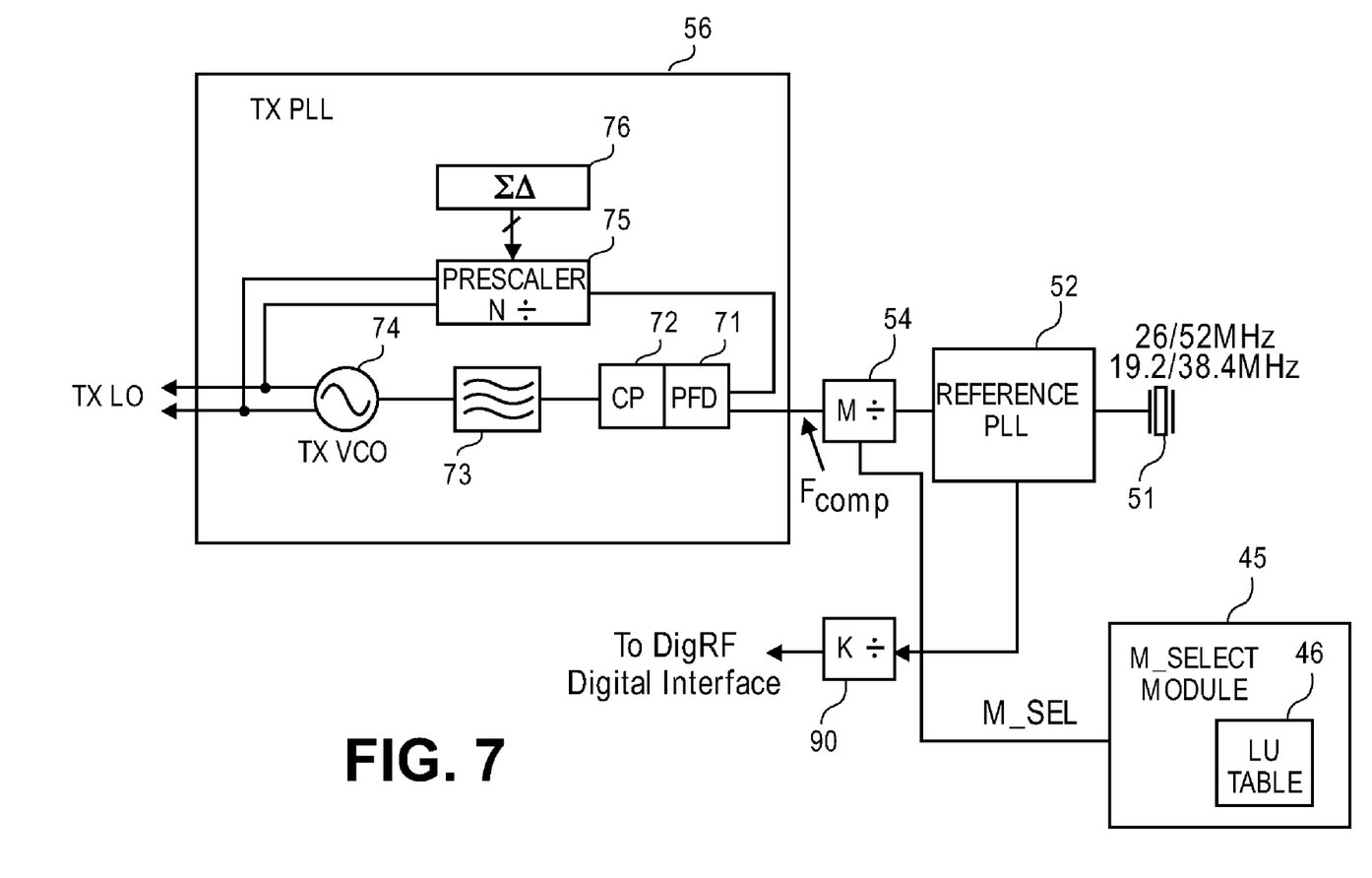
FIG. 7 is a block schematic diagram showing an alternative embodiment for the circuit of FIG. 4 in which a second $F_{comp}$ signal is generated for a digital RF.

FIG. 7 shows an alternative embodiment for practicing the present invention. The circuit of FIG. 7 is the same as the circuit in FIG. 4, but now with the inclusion of a clock signal generation block 90, used for the baseband interface, such as interface 40 shown FIG. 2. This interface may be, but not limited to, any of the MIPI (Mobile Industry Processor Interface) association DigRF (e.g. version-3 or version-4) interfaces. Accordingly, a second output from reference PLL 52 is coupled to divider 90, which has a dividing factor K. Factor K may be fixed or variable. The output from divider 90 is then coupled to the digital baseband interface. Additional clock signal generation blocks may be added that serve other ancillary purposes. One example embodiment, without being limited to this only, is providing the appropriate sampling clock required for each communication standard/protocol to the Analog-to-Digital Converters (ADC), or the Digital-to-Analog Converters (DAC), used in the RX or the TX signal path. In this embodiment, PLL 52 provides clock signals to both the analog stage supported by TX PLL 56 and to the digital stage. Furthermore, the $F_{comp}$ selection may also take into account the prevention of possible interference of the digital communication space. The technique of selecting an optimum $F_{comp}$ to prevent out-of-band spurious emissions may also consider protecting the digital space.

Accordingly, a method for agile region and band conscious frequency planning for wireless transceivers is described.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items.

Furthermore, the term "module" is used herein to describe a functional block and may represent hardware, software, firmware, etc., without limitation to its structure. A "module" may be a circuit, integrated circuit chip or chips, assembly or other component configurations. Accordingly, a "processing module" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions and such processing device may have accompanying memory. A "module" may also be software or software operating in conjunction with hardware.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. A method comprising:
    receiving a first clock signal;
    selecting a comparison frequency from a plurality of comparison frequency values stored in a look-up table based on a particular communication protocol and transmission frequency band selected for operation of a wireless device, wherein the selected comparison frequency is selected in order not to introduce harmonic components of the selected comparison frequency in a transmitted signal from the wireless device that generates spurious emissions restricted by the particular communication protocol or another protocol;
    generating a control signal corresponding to the selected comparison frequency;
    generating a second clock signal from the first clock signal by dividing the first clock signal by a dividing factor determined by the control signal to produce the second clock signal approximately at the selected comparison frequency;
    generating a transmit local oscillator signal from the second clock signal instead of the first clock signal, in which the transmit local oscillator signal is generated separately from a receive local oscillator signal; and
    coupling the transmit local oscillator signal to a first power amplifier of a transmitter when operating using a first communication protocol or coupling the transmit local oscillator signal to a second power amplifier of the transmitter when operating using a second communication protocol.

2. The method of claim 1, wherein selecting the comparison frequency based on the particular communication protocol and transmission frequency band includes determining a geographic region of operation for the wireless device.

3. The method of claim 1, further comprising receiving a reference clock signal and using a phase-locked loop to generate the first clock signal from the reference clock signal.

4. The method of claim 1, further comprising receiving a reference clock signal and using a first phase-locked loop to generate the first clock signal and using a second phase-locked loop to generate the transmit local oscillator signal.

5. A method comprising:
    determining an available frequency band of operation for a wireless device based on a particular communication protocol;
    generating a first clock signal based on a fixed reference clock frequency;
    selecting a comparison frequency from a plurality of comparison frequency values stored in a look-up table based on the particular communication protocol and the available frequency band selected for operation of the wireless device, wherein the selected comparison frequency is selected in order not to introduce harmonic components of the selected comparison frequency in a transmitted signal from the wireless device that generates spurious emissions restricted by the particular communication protocol or another protocol;
    generating a control signal corresponding to the selected comparison frequency;
    generating a second clock signal from the first clock signal by dividing the first clock signal by a dividing factor determined by the control signal to produce the second clock signal approximately at the selected comparison frequency;
    generating a transmit local oscillator signal from the second clock signal instead of the first clock signal, in which the transmit local oscillator signal is generated separately from a receive local oscillator signal; and
    coupling the transmit local oscillator signal to a first power amplifier of a transmitter when operating using a first communication protocol or coupling the transmit local oscillator signal to a second power amplifier of the transmitter when operating using a second communication protocol.

6. The method of claim 5, further comprising using a phase-locked loop to generate the first clock signal.

7. The method of claim 5, further comprising using a first phase-locked loop to generate the first clock signal and a second phase-locked loop to generate the transmit local oscillator signal.

8. An apparatus comprising:
- a first phase-locked loop (PLL) to generate a first clock signal based on a reference clock frequency;
- a frequency selection module to select a comparison frequency from a plurality of comparison frequency values stored in a look-up table based on a particular communication protocol and transmission frequency band selected for operation of a wireless device, wherein the selected comparison frequency is selected in order not to introduce harmonic components of the selected comparison frequency in a transmitted signal from the wireless device that generates spurious emissions restricted by the particular communication protocol or another protocol and the frequency selection module to generate a control signal corresponding to the selected comparison frequency;
- a frequency divider, coupled to receive the first clock signal and the control signal, to divide the first clock signal by a dividing factor determined by the control signal to generate a second clock signal that is approximately at the selected comparison frequency; and
- a second PLL to receive the second clock signal as a reference signal input and to generate a transmit local oscillator signal based on the second clock signal instead of the first clock signal, in which the transmit local oscillator signal is generated separately from a receive local oscillator signal for coupling the transmit local oscillator signal to a first power amplifier of a transmitter when operating using a first communication protocol or coupling the transmit local oscillator signal to a second power amplifier of the transmitter when operating using a second communication protocol.

9. The apparatus of claim 8, wherein the selected comparison frequency based on the particular communication protocol is determined based on a geographic region of operation for the wireless device.

10. The apparatus of claim 8, wherein the communication protocol is based on a third generation partnership project for cellular communication.

11. The apparatus of claim 8, wherein the first PLL also provides a separate clock signal to a digital interface.

12. The apparatus of claim 8, wherein the first PLL also provides a separate clock signal to a digital interface disposed between a radio frequency (RF) front end and a baseband processing stage.

* * * * *